UNITED STATES PATENT OFFICE.

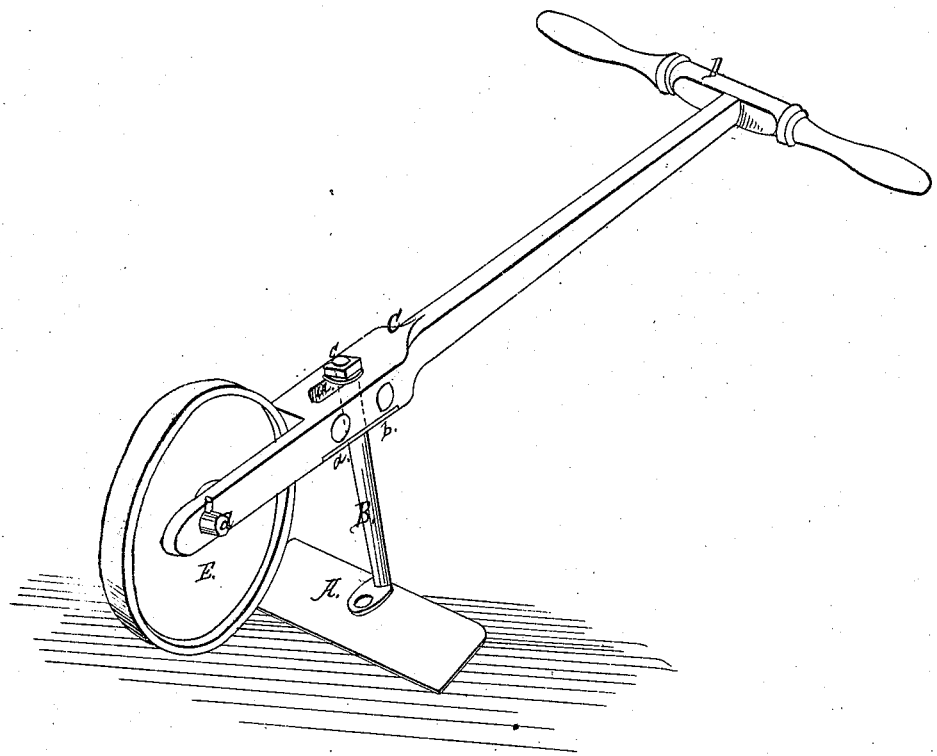

AARON B. ADAMS, OF WESTPORT, ASSIGNOR TO HIMSELF AND WM. C. STREET, OF NORWALK, CONNECTICUT.

WEEDING-HOE.

Specification forming part of Letters Patent No. 44,035, dated August 30, 1864.

*To all whom it may concern:*

Be it known that I, AARON B. ADAMS, of Westport, in the county of Fairfield and State of Connecticut, have invented a new and Improved Weeding-Hoe; and I do hereby declare that the following is a full, clear, and exact description thereof, which will enable others skilled in the art to make and use the same, reference being had to the accompanying drawing, making a part of this specification, said drawing representing a perspective view of my invention.

The object of this invention is a weeding-hoe which can be pushed ahead by the operator, so that he has his work before his eyes, and in pushing the hoe through between the hills or drills of growing plants, or on the paths of a garden, or wherever weeds are to be removed, said hoe can be readily guided to rake all the weeds without injury to the plants.

The nature of my invention and its principal advantages will be more fully understood from the following description.

A represents a weeding-hoe, which is connected in a slightly inclined position to the upright shank B, as clearly shown in the drawing. The upper end of this shank passes through a slot, a, in the pole C, and it is held in place by a shoulder, b, underneath and by a nut, c, above, and by means of this nut the hoe can be readily released and adjusted in the slot backward and forward, as may be desired.

The pole C is provided at one end with a handle, D, which is secured to the same in any convenient manner, so that the operator can take hold of it with both hands and guide the hoe in either direction. The opposite end of the pole is slotted, is made to straddle the wheel E, and it forms the bearings for the axle d, on which said wheel revolves. In using the hoe this wheel bears down upon the ground in front of the hoe, and the pole extends up in an inclined direction, as clearly shown in the drawing. The operator grasps the handle and pushes the implement ahead, and it is desirable to have the handle at a convenient height for the operator. In order to be able to adjust the height of the handle to operators of different stature, the shank B of the hoe is moved in the slot a toward or from the wheel E. By moving the hoe toward the wheel the handle is raised, and by moving the hoe from the wheel the handle is lowered; or, if the operator wishes to give to the hoe more or less cut, he can do so by adjusting the position of the same closer to or farther from the wheel. Without this adjusting-slot the hoe is of very little practical value, for in order to make it work successfully its position has to be changed according to the nature and state of the ground in which it is to be used, and according to the stature of the operator who has to use it.

I claim as new and desire to secure by Letters Patent—

The adjusting-slot a, in combination with the pole C, wheel E, and hoe A, all constructed and operating in the manner and for the purpose substantially as herein shown and described.

AARON B. ADAMS.

Witnesses:
JOSEPH F. FOOTE,
BARNES FINNEY.